United States Patent [19]

Campbell et al.

[11] Patent Number: 5,684,727
[45] Date of Patent: Nov. 4, 1997

[54] HIGH-SPEED CORRELATOR

[75] Inventors: William Norman Campbell, Delta; Kjell Lee Magnussen, Richmond; William John Kury, North Vancouver, all of Canada

[73] Assignee: MacDonald, Dettwiler and Associates Ltd., Canada

[21] Appl. No.: 597,929

[22] Filed: Feb. 7, 1996

[51] Int. Cl.[6] .................................................. G06F 17/15
[52] U.S. Cl. .................................................. 364/728.03
[58] Field of Search .......................... 364/728.03, 728.04, 364/728.05, 728.06, 728.07, 715.11

[56] References Cited

U.S. PATENT DOCUMENTS

| | | | |
|---|---|---|---|
| 4,112,498 | 9/1978 | Reiner et al. | 364/715.11 |
| 4,701,939 | 10/1987 | Stutt et al. | 375/366 |
| 4,835,768 | 5/1989 | Hubbard et al. | 370/512 |
| 5,140,617 | 8/1992 | Kubo | 364/728.03 X |
| 5,140,618 | 8/1992 | Kinoshita et al. | 375/368 |
| 5,172,334 | 12/1992 | Hienerwadel | 364/728.03 X |
| 5,218,562 | 6/1993 | Basehore et al. | 364/728.03 |
| 5,241,568 | 8/1993 | Fernandez et al. | 375/368 |
| 5,251,239 | 10/1993 | Turban et al. | 375/365 |

*Primary Examiner*—Chuong D. Ngo
*Attorney, Agent, or Firm*—Michael A. Lechter

[57] ABSTRACT

A high-speed correlator includes a serial-to-parallel convertor, and a pattern detector. The serial-to-parallel converter converts from ECL to TTL logic. The pattern detector includes a fast latch data pipe, high-speed RAMs and a fast adder. The data pipe applies the received data to the high-speed RAMs as address bits. Depending upon position and errors in the synchronization pattern various locations in the RAM are addressed. By preloading the RAM with appropriate data for a given synchronization pattern, position and error information is read from the addressed location and applied to correlate the data and determine the error content.

12 Claims, 2 Drawing Sheets

HIGH-SPEED CORRELATOR

FIELD OF THE INVENTION

The present invention relates to high-speed correlators and is particularly concerned with satellite communications in which reception of time-division multiple access (TDMA) bursts requires detection of synchronization patterns.

BACKGROUND OF THE INVENTION

It is well known that digital communications require synchronization of the receiver to the transmitter. For burst communications such as TDMA, synchronization is accomplished by inserting a synchronizing word at the transmitter and detecting that word at the receiver.

Reiner et al, in U.S. Pat. No. 4,112,498 teach a digital correlation receiver for detecting, in a serial data bit stream, the synchronizing word. The digital correlator includes a shift register for receiving the incoming bitstream and comparators connected to each cell of the shift register. In the receiver the entire bit sequence is compared bit-wise to the synchronization word. This technique works well, however, increasing transmission rates require the use of faster circuit technology. This may increase the cost and complexity of the digital correlation receiver.

SUMMARY OF THE INVENTION

An object of the present invention is to provide an improved high-speed correlator.

In accordance with an aspect of the present invention there is provided a high speed correlator comprising a serial-to-parallel converter; data and clock inputs connected to the serial-to-parallel converter; a plurality of parallel data latches sequentially connected to the serial-to-parallel converter; a plurality of high speed RAM, each having an address bus and a data bus, the address bus of each RAM connected to predetermined outputs of the parallel data latches for applying sequential bits of data signal as a first part of respective addresses; one RAM having a predetermined number of data bus lines connected to the address busses of the remaining RAM for applying data bits as a second part of respective addresses of the remaining RAM; an adder coupled to a second predetermined number of data bus lines of the high-speed RAM; and a comparator connected to the adder and a predetermined error tolerance indication and having an output for indicating correlation of the data signal.

Advantages of the present invention include a higher bit rate capability than available with comparable technology operating in a serial fashion. The use of slower technology has the advantage of achieving high-speed operation with much lower implementation costs. The higher-speed correlator of the present invention can be extended to accommodate larger sync patterns by adding appropriate components. Greater bit error tolerance can be accommodated by increasing the number of bits output by the high-speed RAMs.

BRIEF DESCRIPTION OF THE DRAWINGS

The invention will be further understood from the following description with reference to the drawings in which.

DETAILED DESCRIPTION

Figure 1A:
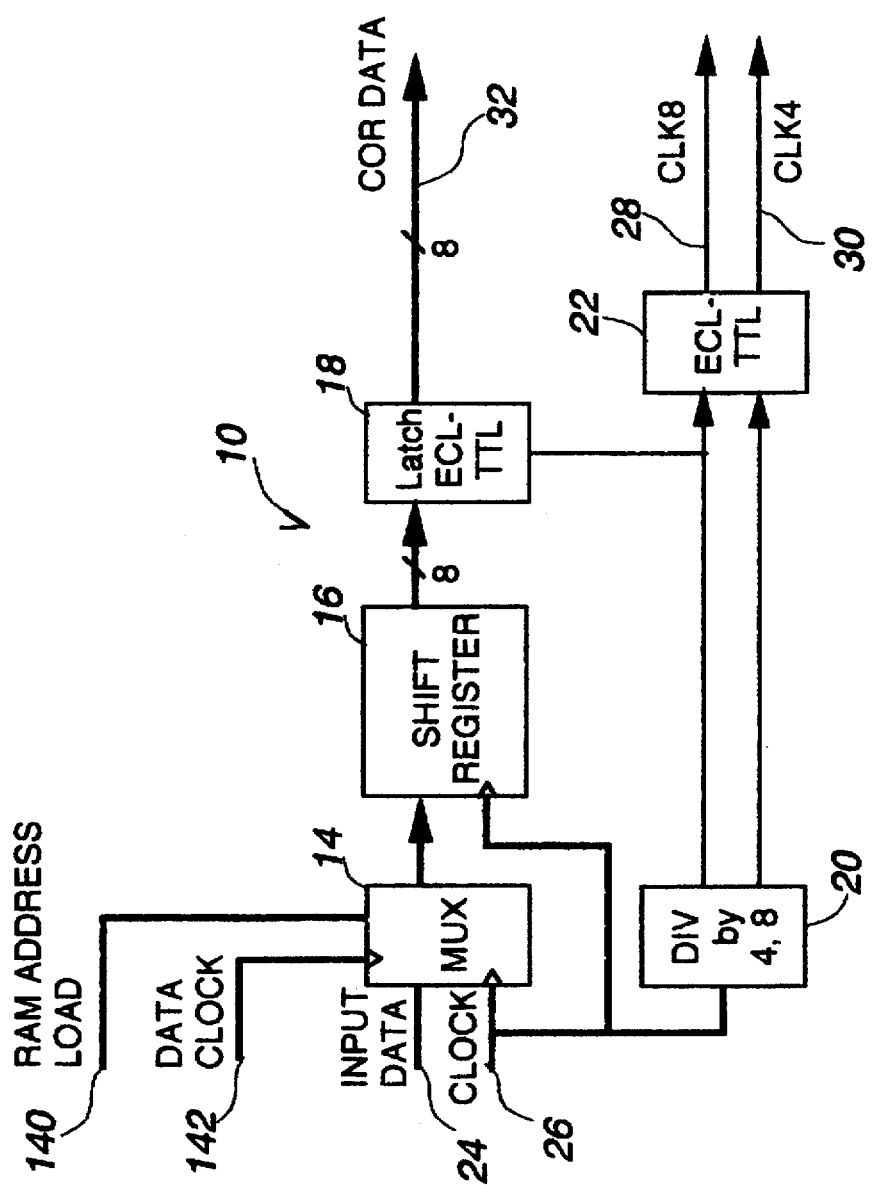
FIGS. 1a and 1b illustrate, in a block diagram, the high-speed correlator in accordance with an embodiment of the present invention.
Figure 1B:
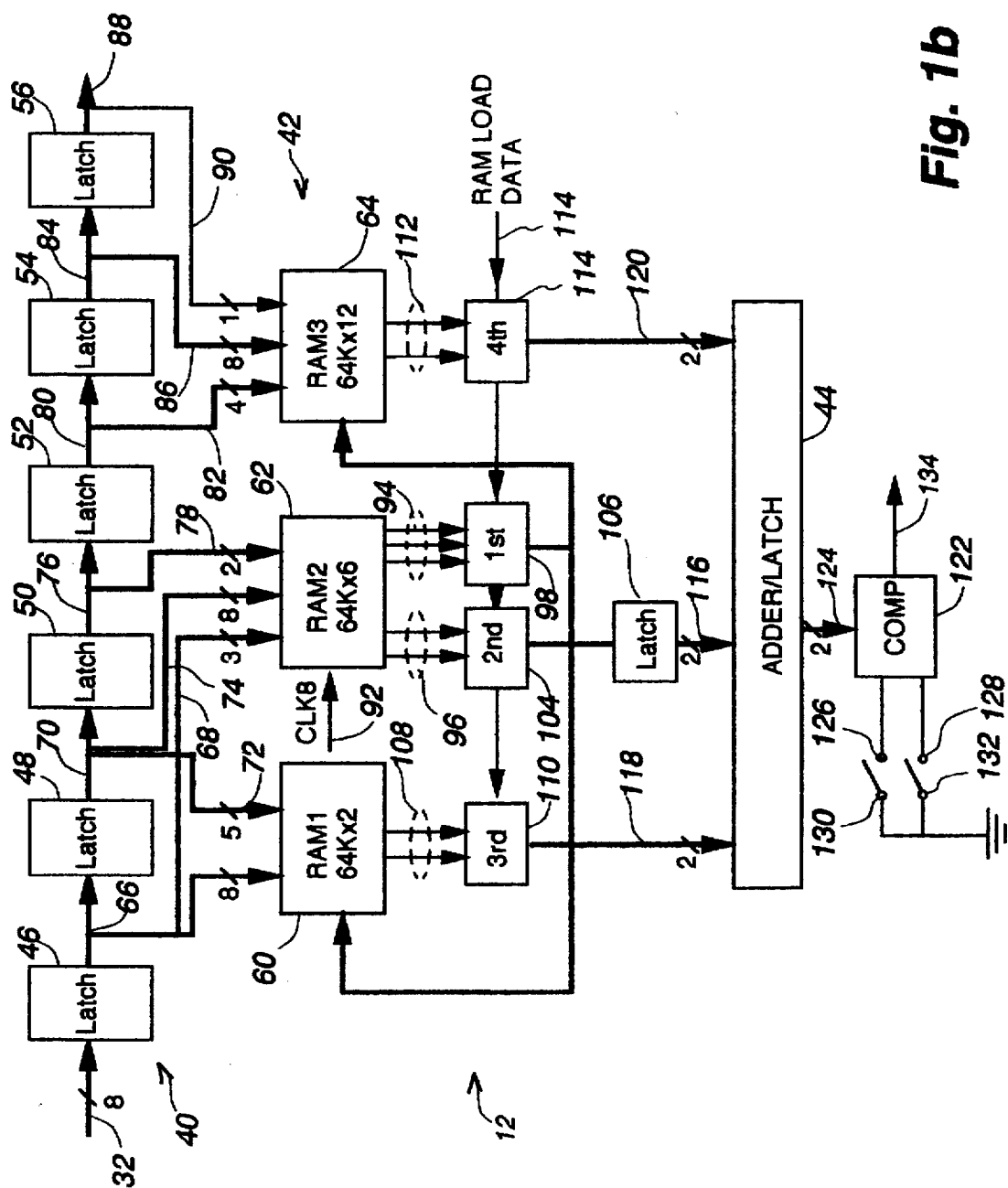

Referring to FIGS. 1a and 1b there is illustrated, in a block diagram, a high-speed correlator in accordance with an embodiment of the present invention. The high-speed correlator includes a serial-parallel converter 10 and a pattern detector 12.

The serial-parallel converter 10 includes a MUX 14, an 8-bit shift register 16, and an ECL-TTL (Emitter-Coupled Logic to Transistor-Transistor Logic) conversion latch 18. The serial-parallel converter 10 also includes a by-4 and by-8 divider 20 and an ECL-TTL converter 22. Inputs for data 24 and clock 26, signals for which are provided by a suitable clock recovery circuit (not shown in FIG. 1), are connected to the MUX 14, the clock input 26 is also connected to the 8-bit shift register 16 and the divider 20.

The output of MUX 14 is connected to the input of the 8-bit shift register 16. The output of the 8-bit shift register 16 is connected to the input of the ECL-TTL conversion latch 18. The divider 20 has outputs for a divided-by-8 clock and a divided-by-4 clock connected to the ECL-TTL converter 22. The divided-by-8 clock is also connected to the ECL-TTL conversion latch 18. The ECL-TTL convertor 22 has outputs 28 and 30 for a converted, divided-by8clock, CLK8, an a converted, divided-by-4 clock, CLK4. The converted clocks, CLK4 and CLK8 are used to clock the pattern detector 12. The output of the ECL-TTL conversion latch 18 is connected to the input 32 of pattern detector 12.

The pattern detector 12 includes a fast latch data pipe 40, high-speed RAMs 42 and a fast adder 44. The fast latch data pipe 40 has six stages 46, 48, 50, 52, 54, 56, each stage comprising a fast latch connected together sequentially. The output from each stage is tapped off to form part of an address bus for the high-speed RAMs 42. The high-speed RAMs 42 include a 64K×2 first RAM 60, a 64K×6 second RAM 62, and a 64K×12 third RAM 64. The high-speed RAMs 42 have 16-bit address busses. The address bus for each high-speed RAM 60, 62, and 64 is connected to the output from the data pipe 40.

The output of first stage 46 is connected to the second stage 48 via an 8-bit bus 66. All eight bits are also connected to the address bus of first RAM 60 as the 4th–11th most significant bits (MSB) of the 16-bit address. The three least significant bits of bus 66 are tapped off by a 3-bit bus 68 and connected to the address bus of second RAM 62 as the 2nd–4th MSBs of the 16-bit address.

The output of second stage 48 is connected to the third stage 50 via an 8-bit bus 70. A 5-bit bus 72 taps off the five MSBs and is connected to first RAM 60 to provide the 5 LSBs of the 16-bit address. All 8-bits are provided to the address bus of second RAM 62 via an 8-bit bus 74 as the 5th–12th MSB of the 16-bit address.

The output of third stage 50 is connected to the fourth stage 52 via an 8-bit bus 76. A 2-bit bus 78 taps off the two MSBs and is connected to second RAM 62 to provide the two LSBs of the 16-bit address.

The output of fourth stage 52 is connected to the fifth stage 54 via an 8-bit bus 80. A 4-bit bus 82 taps off the four LSBs and is connected to the third RAM 64 to provide the 4th–7th MSBs of the 16-bit address thereof.

The output of fifth stage 54 is connected to the sixth stage 56 via an 8-bit bus 84. All 8-bits are provided to the third RAM 64 via an 8-bit bus 86, as the 8th–15th MSBs of the 16-bit address thereof.

The output of sixth stage 56 is connected to an 8-bit bus 88. A line 90 taps off the MSB and is connected to third RAM 64 to provide the bit as the LSB of the 16-bit address thereto.

For the second RAM 62, the clock signal CLK8 is applied as the MSB of the 16-bit address via input 92. The output of second RAM 62 is provided via 3-bit bus 94 and 2-bit bus 96. The 3-bit bus 94 provides the three MSB of the data output to a fast latch 98. The fast latch 98 is connected, via 3-bit busses 100 and 102 to the address bus of first RAM 60 and third RAM 64, respectively. The 3-bit busses 100 and 102 provide position data from the second RAM 62 as the three most significant bits of the 16-bit address busses of first RAM 60 and third RAM 64. The 2-bit bus 96 is connected to a first fast latch 104, which in turn, is connected to a second fast latch 106. A 2-bit bus 108 outputs the two LSB from the first RAM 60 to a third fast latch 110. A 2-bit bus 112 outputs the two LSB from the third RAM 64 to a fourth fast latch 114. Outputs of the second 106, third 110 and fourth 114 fast latches are applied as inputs to the fast adder 44 via 2-bit busses 116, 118, and 120, respectively. The output of fast adder 44 is connected to a comparator 122 via a 2-bit bus 124. The comparator 122 has inputs 126 and 128, selectively connected to ground via switches 130 and 132, respectively. The comparator has an output 134.

In operation, the high-speed correlator receives data and clock signals via inputs 24 and 26, respectively. The data includes a predetermined synchronization word upon which correlation is based. The MUX 14 is provided to allow switching between loading data into the fast RAMs 42 and operating as a high-speed correlator. The fast RAMs 42 are used in correlating, as look-up tables. The data comprising these tables is generated by a computer program and loaded into the fast RAMs 42 prior to use as a high-speed correlator. The computer program and fast RAM loading process are described hereinbelow in further detail. For simplicity in the description of the operation of the high-speed correlator, the fast RAMs 42 are presumed loaded with appropriate look-up tables for the predetermined synchronization word.

The clock signal applied to input 24 is connected to an input of by-4 and by-8 divider 20 and to an input of the 8-bit shift-register 16. The 8-bit shift-register 16 receives the serial bit stream data from the MUX 14 and outputs 8-bit parallel data to the ECL-TTL conversion latch 18. The ECL-TTL conversion latch 18, being clocked by the divided-by-8 clock signal, latches sequential 8-bit sections of the serial bit stream data and converts from ECL signal levels to TTL signal levels. The divided clock outputs of divider 20 are converted by the ECL-TTL converter 22 and provided at outputs 28 and 30 as signals CLK8 and CLK4, respectively.

The converter, divided-by-8 clock, CLK8, is used to clock the stages 46, 48, 50, 52, 54, and 56 of data pipe 40 and to provide the MSB to the address bus of second RAM 64. The converter, divided-by-4 clock, CLK4, is used to clock the fast latches 96, 104, 106, 110, 114, the adder 44, and comparator 122.

The output of the ECL-TTL Conversion Latch 18, COR_ DATA is applied to the input of the data pipe 40 via the 8-bit data bus 32. Selected output from the first and second stages 46 and 48 together with the position data from the first fast latch 96, provide the address for the first RAM 60. Selected output from the first, second and third stages 46, 48 and 50, together with the clock signal CLK8, provide the address for the second RAM 62. Selected output from the fourth, fifth and sixth stages 52, 54 and 56, together with the position data from the first fast latch 96, provide the address for the third RAM 64.

The addressing of fast RAMs 42 accesses the look-up tables stored therein. The 2-bit output of first, second, and third RAMs 60, 62 and 64, represents the number of errors 0, 1, 2 or more than 2, found in the look-up table given the address applied. The 3-bit output of second RAM 62 represents position data for the synchronization word.

The high-speed correlator relies on two principles:

sync patterns are constructed such that they do not auto-correlate well; and once a bit stream has been split into 8-bit words by ECL circuitry, downstream circuitry, running at 1/8th the speed can be implemented using TTL circuitry.

Thus, the high-speed correlator takes the 8-bit words of incoming data and applies them as address to fast RAMs 42. The second RAM 62 has 15 consecutive bits applied to its address bus plus the CLK8 clock signal as MSB. If the sync pattern is found by addressing an appropriate section of second RAM 62, data representing position within an 8-bit window is provided to the first and third RAMs 60 and 64, in the form of 3 MSB of address. If RAMs 60 and 64 look in these addressed locations, the data representing error indications is output as 2-bits (all the data stored in the first RAM 60, the 2 LSB of data stored in the third RAM 64). The user settable switches 130 and 132 predetermine error tolerance for the correlator as 0, 1 or 2 errors. Depending upon the error count output from the adder 44 and the error tolerance setting of switches 130 and 132, the comparator 122 outputs an indication of correlation via the output 134. The correlation output is used in known manner by the receiving circuitry, not part of the present embodiment and hence not illustrated in the figure.

Referring again to the figure, the MUX 14 includes a second set of data and clock inputs 140 and 142 for use in loading the fast RAMs 42. Fast latches 96, 104, 110, 114 are connected to an input 144 for loading the RAM look-up table data.

For loading the fast RAMs 42 the addresses are generated by feeding serial data into the ECL 8-bit shift register via the input 140 of MUX 14. The data is applied via a tri-state buffer into the data I/O lines of RAM 42.

The data for loading fast RAMs 42 is generated in a computer and downloaded to the tri-state buffer. The program for generating the data is attached hereto as Appendix I.

The operation of the high-speed correlator will now be explained in further detail by way of a simplified example.

Consider a smaller version of the correlator, reduced in size to simplify the description of operation. For this example it is assumed that there is a need to correlate to a sync pattern that is only 12 bits in length, and the serial-to-parallel converter converts 4 bits at a time, instead of 8. The sync pattern to be correlated to is 101110101100 in binary notation.

The second RAM, which determines the position of the correlation, will examine 6 bits near the middle of the sync pattern. Since there is no fixed timing relationship between the serial-to-parallel converter and the source of the data (including the sync word), the sync word can appear at the input to the RAMs in any one of four positions:

Six bits applied to a second ram address

TABLE A

| | | ↓ | ↓ | ↓ | ↓ | ↓ | ↓ | | | | |
|---|---|---|---|---|---|---|---|---|---|---|---|
| 1 | 0 | 1 | 1 | 1 | 0 | 1 | 0 | 1 | 1 | 0 | 0 | |
| | 1 | 0 | 1 | 1 | 1 | 0 | 1 | 0 | 1 | 1 | 0 | 0 |
| | | 1 | 0 | 1 | 1 | 1 | 0 | 1 | 0 | 1 | 1 | 0 | 0 |
| | | | 1 | 0 | 1 | 1 | 1 | 0 | 1 | 0 | 1 | 1 | 0 | 0 |

TABLE A

If the sync pattern is present at the input to the second RAM, it presents one of the following patterns to the address lines of the second RAM:

TABLE B

| |
|---|
| 010110 |
| 101011 |
| 110101 |
| 111010 |

However, if the sync pattern has been corrupted by errors, other patterns are possible. Again for the sake of simplicity, assume at most one bit has been corrupted. The first pattern (010110) then could become six other patterns:

TABLE C

| |
|---|
| 110110 (if the first bit is corrupted) |
| 000110 (if the second bit is corrupted) |
| 011110 (if the third bit is corrupted) |
| 010010 (if the fourth bit is corrupted) |
| 010100 (if the fifth bit is corrupted) |
| 010111 (if the last bit is corrupted) |

Similarly, each of the other three patterns could be received as shown above or as six different patterns, depending on the position of the corrupted bit. Therefore, the second RAM must recognize a total of 4+4*6=28 different patterns as being possible sync patterns. Note that it is possible that 2 or more of these 28 patterns may in fact be the same pattern. However, this is an artifact of the small size of this example. In normal operation, with 15 bits of data being applied to the input of the second RAM, and with sync patterns usually being chosen to avoid matches with shifted permutations of the same pattern, this is unlikely to happen.

To implement the "recognition", the second RAM is preloaded with values that produce the desired result. For instance, consider the first pattern in TABLE B. In hex notation this is 16. Since this pattern corresponds to a position code of 0, with 0 bit errors, this means that address 16 in the RAM must be loaded with the value 00, where the first 0 is the position code and the second is the number of bits in error. Similarly (referring to the first pattern in TABLE C address 36 must be loaded with the value 01. Referring to the second pattern in TABLE B, address 2B must be loaded with the value 10 (position code 1,0 bit errors). Similarly, all other variations result in values that must be loaded into certain addresses in the RAM. All other addresses in the RAM, so far unused, must be loaded with the value 03 (the 0 is irrelevant, the 3 indicates "more than 2 bit errors").

To continue with the example, if the second RAM recognizes the first pattern (010110) or any of its six variations, it outputs a "Position" code of 0. If it recognizes the second pattern (101011) or any of its six variations, it outputs a position code of 1, and so on, up to a position code of 3.

The position code is applied to the inputs of the first and third RAMs, in addition to data bits to the left and right of those applied to the second RAM.

Referring to FIG. 1, if the first ram examines the 5 data bits to the left of the second ram, and the second ram is sending a position code of 0 to the first ram, then the first ram must recognize the five bits 10111, or any of the five variations corresponding to one bit in error. If the second ram is sending a position code of 1, then the first ram must recognize the four bits 1011 or any of the four variations corresponding to one bit in error (note that the fifth (leftmost) bit applied to the first ram is in this case not used in the correlation). Similar arguments apply if the position code is 2 or 3.

If the third RAM examines the 4 bits to the right of the second RAM, then, if the second RAM sends a position code of 0 to the third ram, then the third RAM must recognize the pattern 0 (followed by four bits that are not used), or the pattern 1 (if the single bit is corrupted by an error). If the second ram sends a position code of 1, then the third ram must recognize the pattern 00 or either of the two variations due to one bit in error. Similar arguments apply if the position code is 2 or 3.

All three of the RAMs output the number of bits in error, in the section of data that they are examining. The adder adds the three numbers together, and the comparator compares the result to the tolerance set on the user-settable switches. If the total number of errors is less than or equal to the switch setting, a correlation is declared.

APPENDIX

```
//(@)(#)...
// %W% %G%    %Y%
/* $Id$
$Log$ */
/*****************************************************************

Filename:     HSC_LOAD.C
Project:      High-Speed Correlator Prototype
Purpose:      Functions to load RAMs and Test Gen.
Edition :     %I% %E%
Language:     Microsoft C
Destination:  WIN32S Author                      Changes
Norm Campbell               Initial version
                            Swapped RAM1 and RAM3 nomenclature because on
                            schematics, RAM3 is on MSB end of data.
-------------------------------------------------------------------

Other Notes:

*****************************************************************/
#ifndef NO_SCCSID
static char sccsid[] = "%W% %E%";
endif // --- INCLUDES
include "hsc.h"
#include <stdio.h>

// --- FUNCTIONS

BOOL LoadCorrelator (int Port, char *SyncCode,
                     char *AltSyncCode,
                     int NumBits, int CorrMode)
    {
    OFSTRUCT of;
    HFILE hFile = 0;
    int Tmp = 0;

if (!GenRAMContents (lpRAM1, lpRAM2, lpRAM3, SyncCode, AltSyncCode, NumBits, CorrMode))
        {
        ErrMsgBox ("LoadCorrelator", IDS_ERR_GENRAM, NULL);
        return FALSE;
        }
    hFile = OpenFile ("RAM1.DAT", &of, OF_CREATE);
    Tmp = _lwrite (hFile, lpRAM1, 32768);
    Tmp = _lwrite (hFile, &lpRAM1[32768], 32768);      // These lines cause compiler warning:
    _lclose (hFile);
    hFile = OpenFile ("RAM2.DAT", &of, OF_CREATE);
    Tmp = _lwrite (hFile, lpRAM2, 32768);
    Tmp = _lwrite (hFile, &lpRAM2[32768], 32768);
    _lclose (hFile);
    hFile = OpenFile ("RAM3.DAT", &of, OF_CREATE);
    Tmp = _lwrite (hFile, lpRAM3, 32768);
    Tmp = _lwrite (hFile, &lpRAM3[32768], 32768);
    _lclose (hFile);

if (!LoadRAMs (lpRAM1, lpRAM2, lpRAM3, Port))
        {
        ErrMsgBox ("LoadCorrelator", IDS_ERR_LOADRAM, NULL);
        return FALSE;
        } return TRUE;
    }

BOOL LoadTG (int Port, unsigned long TGValue)
    {
    // Declare temporary variables
    int Bit = 0;
```

- 2 -

```
    // Check input parameters for validity
    if (Port <= 0) return FALSE;

// Power up values - set parallel port bits to:
    //    Select Ram_Clk from PC
    //    Enable normal operation
    //    Deassert all clocks
    //    Deassert Ram Data
    //    Deassert RamWrite & RamEnab
    //    Deassert ShiftEnab
    //    Deassert Muxsel
    _asm
      {
         mov   dx,Port              ; Store port base address to register
         mov   al,DATAREG_ENAB + DATAREG_CLKSEL1
         out   dx,al                ; Output byte to port
         add   dx,2                 ; Increment address to control register
         mov   al,CNTLREG_RAM_ENAB
         out   dx,al                ; Output byte to port
      }

// Write TGValue to parallel port, MSB first
    // bTemp = TGValue shifted right (31 - Bit) times then ANDed with 1
    //         to mask bit
    for (Bit = 0; Bit < 32; Bit++)
    {
       char bTemp = (char) ((TGValue >> (31 - Bit)) & 1);
       _asm
         {
            mov   dx,Port           ; Store port base address to register
            in    al,dx             ; Input data from port value
            mov   al,bTemp          ; Store bit to register
            shl   al,4              ; Shift bit left to proper position
            or    al,DATAREG_ENAB+DATAREG_CLKSEL1
            out   dx,al             ; Output bit to port
            or    al,20h            ; Assert TG clock bit
            out   dx,al             ; Output bit to port
         }
    }

// Return with OK status
    return TRUE;
}

BOOL GenRAMContents (unsigned char huge *RAM1,    // IN OUT
                     unsigned char huge *RAM2,    // IN OUT
                     unsigned char huge *RAM3,    // IN OUT
                     char *SyncCode,              // IN
                     char *AltSyncCode,           // IN
                     int NumBits,                 // IN
                     int CorrMode)                // IN
{
   char OneCountLUT [256];

long int lMask = 0;
   long int lAddr = 0;
   long int lShiftedSync = 0;
   short int OneCount = 0;
   unsigned short XOR = 0;
   short int Posn = 0;
   short int I = 0;
   long int Multiples = 0;
   unsigned short SyncChunk = 0;
   unsigned short AlternSyncChunk = 0;
   int SyncStartIndex = 0;
   int Bit = 0;
   int Tmp = 0;

// Init "progress gauge"
   hWndGauge = CreateWindow ("ZYZGauge", NULL,
                     WS_CHILDWINDOW | WS_VISIBLE | ZYZGS_3D,
                     100, 50, 200, 50,          // position and size
                     hWndMain, 1, hInst, NULL);
   SendMessage(hWndGauge, ZYZG_SETORIENTATION,
```

- 3 -

```
            ZYZG_ORIENT_LEFTTORIGHT, 0);
    SendMessage(hwndGauge, ZYZG_SETRANGE, 1024, 0);

// Init "OneCount" lookup table. If paired bit errors are to be considered
// a single error, count them as such, and also set flags (MSB_SET and LSB_SET)
// if the MSB or LSB are set in the LUT address, so that later code can identify
// a paired error that is split across two bytes.
    for (lAddr = 0; lAddr < 256; lAddr++)
    {
        OneCountLUT [lAddr] = 0;
        if (BitErrorType == PAIRED_ERRORS)
        {
            long int lTemp = lAddr;
            for (I = 0; lTemp != 0; I++)
            {
                if ((lTemp & 0x03) == 3)
                {
                    OneCountLUT [lAddr] += 1;
                    lTemp >>= 2;
                }
                else
                {
                    if (lTemp & 0x01)
                    {
                        OneCountLUT [lAddr] += 1;
                    }
                    lTemp >>= 1;
                }
            }
            if ((lAddr & 0x03) == 0x01) OneCountLUT [lAddr] |= LSB_SET;
            if ((lAddr & 0xC0) == 0x80) OneCountLUT [lAddr] |= MSB_SET;
        }
        else
            for (I = 0; I < 8; I++)
                OneCountLUT [lAddr] += (lAddr >> I) & 1;
    }

// Calculate RAM 2 contents
/*
    48..42 bit sync words:
                                            <-- (right edge "moves", for sizes < 48 bits)
Posn7: +---------------------------------------+
Posn0:         +-------------------------------------+

^^^^^^^^^^|||||||||||||||^^^^^^^^^^
        <---- 13 ---><----- 15 -----><---- 13 ---->
             RAM 3        RAM 2          RAM 1

41..29 bit sync words:

--> (left edge "moves", for sizes < 41 bits)
Posn7: +---------------------------------------+
Posn0·         +-------------------------------------+

^^^^^^^^^^|||||||||||||||^^^^^^^^^^^
        <---- 13 ---><----- 15 -----><---- 13 --->

28..22 bit sync words:

<-- (right edge "moves", for sizes < 28 bits)
Posn7:               +-----------------------+
Posn0:                   +-------------------------+

^^^^^^^^^^|||||||||||||||^^^^^^^^^^
        <---- 13 ---><----- 15 -----><----- 13 --->

Also see diagram in online Help, "General Concepts" section, for several examples
*/
    if (CorrMode == BIT_BY_BIT)
    {
```

```
           if (NumBits > 41)
               SyncStartIndex = 20;
           else if (NumBits > 20)
               SyncStartIndex = 20 - (41 - NumBits);
           else
               SyncStartIndex = 0;                        // only good down to 15 bits
           }
       else                           // BYTE_BY_BYTE
           {
           if (NumBits > 41)
               SyncStartIndex = 13;
           else if (NumBits > 28)
               SyncStartIndex = 13 - (41 - NumBits);
           else if (NumBits > 21)
               SyncStartIndex = 0;
           else
               // Note that <= 21 could be handled, but at the risk of multiple possible
               // matches, at different Posns. For max generality, should go ahead and
               // calculate it anyhow, and warn/abort if ambiguities exist.
               ErrMsgBox ("GenRAMContents", IDS_ERR_INVAL_NUMBITS, NULL);
           }

Tmp = SyncStartIndex;
       SyncChunk = AlternSyncChunk = 0;
       for (Bit = 0; Bit < 15; Bit++)
           {
           SyncChunk <<= 1;
           SyncChunk += (SyncCode [Tmp++] & 1);
           }
       if (CorrMode == BYTE_BY_BYTE_ALTERN)
           {
           Tmp = SyncStartIndex-Posn;
           for (Bit = 0; Bit < 15; Bit++)
               {
               AlternSyncChunk <<= 1;
               AlternSyncChunk += (AltSyncCode [Tmp++] & 1);
               }
           } for (lAddr = 0; lAddr < (CorrMode==BYTE_BY_BYTE_ALTERN? RAM_SIZE:RAM_SIZE>>1);
               lAddr++)
           {
           RAM2 [lAddr] = 3;                  // 3 errors
           } for (Posn = 0; Posn < ((CorrMode==BIT_BY_BIT)? 1:8); Posn++)
           {
           // Update progress gauge
           SendMessage (hWndGauge, ZYZG_SETPOSITION, Posn << 6, 0);   // << 8?

for (lAddr = 0; lAddr < (CorrMode==BYTE_BY_BYTE_ALTERN? RAM_SIZE:RAM_SIZE>>1);
                   lAddr++)
//             {
//             if (lAddr == 0x453D)
                   Tmp += 0;                 // @debug - for a breakpoint // Count "1"s in the XORed value. Subtract one if most-significant byte has
               // LSB set AND least-significant byte has MSB set AND paired errors are to
               // be considered a single error.
               XOR = ((lAddr & 0x60C0 ? AlternSyncChunk : SyncChunk) ^ (unsigned short)lAddr) & 0x7F
               OneCount = (OneCountLUT [XOR & 0xFF] & 0x0F) +
                          (OneCountLUT [XOR >> 8] & 0x0F) -
                          (((OneCountLUT [XOR & 0xFF] & MSB_SET) >> MSB_SET_SHIFT) &
                           ((OneCountLUT [XOR >> 8] & LSB_SET) >> LSB_SET_SHIFT));
               if (OneCount <= 2)
                   {
                   if ((RAM2 [lAddr] & 0x3) < 3)       // Can never happen in bit-by-bit mode
                       {
                       char szString2 [80];
                       LoadString (hInst, IDS_ERR_AMBIG_POSN, szString, sizeof(szString));
                       sprintf (szString2, szString, lAddr);
                       if (MessageBox (hWndMain, szString2, "GenRAMContents", MB_OKCANCEL) == IDCANCEL
                           {
                           DestroyWindow (hWndGauge);
```

- 5 -

```
                    return FALSE;
                }
            }
            RAM2 [lAddr] = (unsigned char) (OneCount + (Posn << 2));
        }
    }
    SyncChunk = (SyncChunk << 1) + (SyncCode [Tmp] & 1);
    AlternSyncChunk = (AlternSyncChunk << 1) + (AltSyncCode [Tmp++] & 1);
    }

// Now calculate RAMs 1 and 3
for (lAddr = 0; lAddr < RAM_SIZE; lAddr++)
{
    int Altern = 0;
//    if (lAddr == 0x0FB8)
//        Tmp += 0;              // @debug - to provide a breakpoint if ((lAddr & 0x1FF) == 0)
        SendMessage (hWndGauge, ZYZG_SETPOSITION,
                     512 + (int)(lAddr / (RAM_SIZE>>9)), 0);

RAM1 [lAddr] = 3;
    RAM3 [lAddr] = 3;

SyncChunk = 0;
    AlternSyncChunk = 0;
    Posn = (CorrMode == BIT_BY_BIT) ? 0 : (int) (lAddr >> 13);
    for (Altern = 0; Altern < (CorrMode==BYTE_BY_BYTE_ALTERN? 2:1); Altern++)
    {
        unsigned int Mask = 0;

// RAM 3 first
        if (NumBits > 41)
        {
            SyncStartIndex = Posn;
            Mask = 0x1FFF;
        }
        else if (NumBits > 28)
        {
            SyncStartIndex = Posn - (41 - NumBits);    // can be negative
            Mask = 0x1FFF >> max (0, (41 - NumBits - Posn));
        }
        else if (NumBits > 21)
        {
            SyncStartIndex = Posn - 13;
            Mask = 0x1FFF >> (13 - Posn);
        }
        Tmp = max (0, SyncStartIndex);
        for (Bit = max (0, -SyncStartIndex); Bit < 13; Bit++)
        {
            SyncChunk <<= 1;
            SyncChunk += (SyncCode [Tmp] & 1);
            AlternSyncChunk <<= 1;
            AlternSyncChunk += (AltSyncCode [Tmp++] & 1);
        }

XOR = (((Altern == 0)? SyncChunk:AlternSyncChunk) ^ (unsigned short) lAddr) & Mask;
        OneCount = (OneCountLUT [XOR & 0xFF] & 0x0F) +
                   (OneCountLUT [XOR >> 8] & 0x0F) -
                   (((OneCountLUT [XOR & 0xFF] & MSB_SET) >> MSB_SET_SHIFT) &
                    ((OneCountLUT [XOR >> 8] & LSB_SET) >> LSB_SET_SHIFT));
        if ((RAM3 [lAddr] < 3) && (OneCount < 3))
        {
            sprintf (szString, "%lXh in RAM3", lAddr);
            ErrMsgBox ("GenRAMContents", IDS_ERR_AMBIG_ALTERN, szString);
        }
        if (OneCount < 3)
            RAM3 [lAddr] = (unsigned char) OneCount;

// Now RAM 1
        if (CorrMode == BIT_BY_BIT)
        {
            if (NumBits > 41)
            {
```

- 6 -

```
            SyncStartIndex = 28;
            Mask = (0x3F << (41 - NumBits)) & 0x3F;
        }
        else if (NumBits > 28)
        {
            SyncStartIndex = NumBits - 13;
            Mask = 0x3F;
        }
        else if (NumBits > 15)
        {
            SyncStartIndex = 15;
            Mask = (0x3F << (21 - NumBits)) & 0x3F;
        }
    }
    else
    {
        if (NumBits > 41)
        {
            SyncStartIndex = Posn + 28;
            Mask = 0x1FFF << max (0, (41 - NumBits + Posn));
        }
        else if (NumBits > 28)
        {
            SyncStartIndex = Posn + NumBits - 13;
            Mask = 0x1FFF << Posn;
        }
        else if (NumBits > 21)
        {
            SyncStartIndex = Posn + 15;
            Mask = 0x1FFF << (28 - NumBits + Posn);
        }
    }
    Mask &= 0x1FFF;
    Tmp = SyncStartIndex;
    for (Bit = 0; Bit < 13; Bit++)
    {
        SyncChunk <<= 1;
        SyncChunk += (SyncCode [Tmp] & 1);
        AlternSyncChunk <<= 1;
        AlternSyncChunk += (AltSyncCode [Tmp++] & 1);
    }

XOR = ((Altern == 0? SyncChunk:AlternSyncChunk) ^ (unsigned int)lAddr) & Mask;
//  OneCount = OneCountLUT [XOR & 0xFF] + OneCountLUT [XOR >> 8];
    OneCount = (OneCountLUT [XOR & 0xFF] & 0x0F) +
               (OneCountLUT [XOR >> 8] & 0x0F) -
               (((OneCountLUT [XOR & 0xFF] & MSB_SET) >> MSB_SET_SHIFT) &
                ((OneCountLUT [XOR >> 8] & LSB_SET) >> LSB_SET_SHIFT));
//  @temporary for prototype - remove "if (Altern==0)" when addr PALs fixed
    if (Altern == 0)   // Need to use > 32 bits or else RAM1 will be
    {                  // full of 0s due to both alternatives, leading to
                       // false correlations (mainly because RAM3 still has
                       // to be loaded with zeroes until last 2 address PALs fixed
        if ((RAM1 [lAddr] < 3) && (OneCount < 3))
        {
            sprintf (szString, "%lXh in RAM1", lAddr);
            ErrMsgBox ("GenRAMContents", IDS_ERR_AMBIG_ALTERN, szString);
        }
        if (OneCount < 3)
            RAM1 [lAddr] = (unsigned char) OneCount;
    }
}
DestroyWindow (hWndGauge);
return TRUE;
}

BOOL LoadRAMs (unsigned char huge *RAM1, unsigned char huge *RAM2,
               unsigned char huge *RAM3, int Port)
{
    long RAM13Addr = 0;
    long RAM2Addr = 0;
```

- 7 -

```
    int Posn = 0;
    int DataIn = 0;
    int Shift = 0;
    BYTE SerData = 0;
    BYTE RAMData = 0;
    int Temp = 0;
    HDC hDC = 0;
    int yText = 0;
    char szTemp [50];
    int Tmp = 0;
    long lMSBMask = 0;

// Init "progress gauge"
    hWndGauge = CreateWindow ("zYzGauge", NULL,
                            WS_CHILDWINDOW | WS_VISIBLE | ZYZGS_3D,
                            100, 50, 200, 50,    // position and size
                            hWndMain, 1, hInst, NULL);
    SendMessage(hWndGauge, ZYZG_SETORIENTATION,
                ZYZG_ORIENT_LEFTTORIGHT, 0);
    SendMessage(hWndGauge, ZYZG_SETRANGE, 1024, 0);

hDC = GetDC (hWndMain);
    yText = 10;
    if (CorrMode == BYTE_BY_BYTE_ALTERN)
        lMSBMask = 0xFFFFL;
    else
        lMSBMask = 0x7FFFL;

// Deassert RAMENAB and ENAB
// Assert RAM_WRITE, PC_TGCLK, CLKSEL1, SHIFT_ENAB
// Pulse RAMCLK
// Assert ENAB
    _asm
    {
        mov  dx, Port
        add  dx, DATAREG_OFFSET
        in   al, dx
        and  al, 0xFF-DATAREG_ENAB-DATAREG_RAMCLK
        out  dx, al add  dx, CNTLREG_OFFSET-DATAREG_OFFSET
        in   al, dx
        and  al, 0xFF-CNTLREG_RAM_ENAB
        out  dx, al
        or   al, CNTLREG_RAM_WRITE+CNTLREG_SHIFTENAB
        out  dx, al sub  dx, CNTLREG_OFFSET-DATAREG_OFFSET
        in   al, dx
        or   al, DATAREG_TGCLK+DATAREG_CLKSEL1
        out  dx, al
        or   al, DATAREG_RAMCLK
        out  dx, al
        and  al, 0xFF-DATAREG_RAMCLK
        or   al, DATAREG_ENAB
        out  dx, al
    }

// Pulse RAMCLK 4 times so that CLKS starts in the "0" state
    _asm
    {
        mov  dx, Port
        add  dx, DATAREG_OFFSET
        in   al, dx
        and  al, 0xFF-DATAREG_RAMDATA-DATAREG_RAMCLK-DATAREG_SERDATA
        out  dx, al
        or   al, DATAREG_RAMCLK
        out  dx, al
        and  al, 0xFF-DATAREG_RAMDATA-DATAREG_RAMCLK-DATAREG_SERDATA
        out  dx, al
        or   al, DATAREG_RAMCLK
        out  dx, al
        and  al, 0xFF-DATAREG_RAMDATA-DATAREG_RAMCLK-DATAREG_SERDATA
        out  dx, al
```

```
       or    al,DATAREG_RAMCLK
       out   dx,al
       and   al,0xFF-DATAREG_RAMDATA-DATAREG_RAMCLK-DATAREG_SERDATA
       out   dx,al
       or    al,DATAREG_RAMCLK
       out   dx,al
       }

// Main loop, for each RAM address
   for (RAM2Addr = 0; RAM2Addr < RAM_SIZE; RAM2Addr++)
   {
       // Update progress gauge every 1024 iterations or so
       if ((RAM2Addr & 0x3FF) == 0) SendMessage (hWndGauge, ZYZG_SETPOSITION,
                                     (int) (RAM2Addr / (RAM_SIZE>>10)), 0);

// Rotate RAM2Addr left 5 to get RAM13Addr
       if (RAM2Addr == 0x3228L)        // wart
           Tmp = 0;
       RAM13Addr = ((RAM2Addr << 5) & 0xFFE0) + (RAM2Addr >> 11);
       Posn = (int) (RAM13Addr >> 13);
       DataIn = (int) ((Posn << 10) +
                ((RAM2[RAM2Addr&1MSBMask] & 0x18) << 2) + ((RAM2[RAM2Addr&1MSBMask] & 0x7) << 7) +
                ((RAM3[RAM13Addr] & 0x3) << 3) +
                ((RAM1[RAM13Addr] & 0x3) << 1) +
                ((CorrMode == BYTE_BY_BYTE_ALTERN)? 1 : 0));
//              ((2 & 0x7) << 7) +
//              ((3 & 0x3) << 3) +                       // @debug - set RAM3=1,2=2,3=3
//              ((1 & 0x3) << 1));
   // @temporary: in TM mode, clear RAM3 bits until prototype PALs U21 and U22 are updated
   if (CorrMode == BYTE_BY_BYTE_ALTERN)
       DataIn &= 0xFFE7;

for (Shift = (RAM2Addr==0x6000L)?43:47; Shift >= 0; Shift--)
   {
       if (Shift >= 30 && Shift <= 42)
       {
           SerData = (BYTE) ((RAM13Addr >> (Shift - 30)) & 1);
       }
       else if (Shift >= 7 && Shift <= 21)
       {
           SerData = (BYTE) ((RAM2Addr >> (Shift - 7)) & 1);
       }
       else if (Shift >= 2 && Shift <= 6)
       {
           SerData = (BYTE) ((RAM13Addr >> (Shift - 2)) & 1);
       }
       else
       {
           SerData = 0;
       }
       szTemp [Tmp++] = (char)((SerData!=0)? '1' : '0');

if (SerData != 0) SerData = DATAREG_SERDATA;

if ((Shift >= 0) && (Shift <= 12))
       {
           RAMData = (BYTE) ((DataIn >> Shift) & 1);
       }
       else
       {
           RAMData = 0;
       }
//         szTemp [Tmp++] = (char)((RAMData!=0)? '1' : '0');
       if (RAMData != 0) RAMData = DATAREG_RAMDATA;

// Put SerData and RAMData into I/O register
       // Set clock to 0 then 1, to shift the 2 bits in
       _asm
       {
           mov   dx,Port
           add   dx,DATAREG_OFFSET
           in    al,dx
           and   al,0xFF-DATAREG_RAMDATA-DATAREG_RAMCLK-DATAREG_SERDATA
           or    al,SerData
```

```
            or   al,RAMData
            out  dx,al
            or   al,DATAREG_RAMCLK
            out  dx,al
            }
//      // Pulse clock once more to get the last bit of address and data into position
        // Pulse RAM_Enab bit high then low
        Temp = 0;
        _asm
            {
            mov  dx,Port
            add  dx,DATAREG_OFFSET
//          in   al,dx
//          and  al,0xFF-DATAREG_RAMDATA-DATAREG_RAMCLK-DATAREG_SERDATA
//          out  dx,al
//          or   al,DATAREG_RAMCLK
//          out  dx,al
            add  dx,CNTLREG_OFFSET-DATAREG_OFFSET
            in   al,dx
            or   al,CNTLREG_RAM_ENAB
            out  dx,al
            and  al,0xFF-CNTLREG_RAM_ENAB
            out  dx,al
            }
        if ((RAM2Addr < 0x3300L) && (RAM2Addr >= 0x3228L))
            TextOut (hDC, 10, yText+=20, szTemp, Tmp);
        Tmp = 0;
        }
    // Deassert RAM_WRITE then assert RAM_ENAB
    _asm
        {
        mov  dx,Port
        add  dx,CNTLREG_OFFSET
        in   al,dx
        and  al,0xFF-CNTLREG_RAM_WRITE-CNTLREG_SHIFTENAB
        out  dx,al
        or   al,CNTLREG_RAM_ENAB
        out  dx,al
        }
    ReleaseDC (hWndMain, hDC);
    DestroyWindow (hWndGauge);
    return TRUE;
    }
```

We claim:

1. A high speed correlator comprising:

a serial-to-parallel converter;

data and clock inputs connected to the serial-to-parallel converter;

a plurality of parallel data latches sequentially connected to the serial-to-parallel converter;

a plurality of high-speed RAM, each having an address bus and a data bus, the address bus of each RAM connected to predetermined outputs of the parallel data latches for applying sequential bits of data signal as a first part of respective addresses; one RAM having a predetermined number of data bus lines connected to the address busses of the remaining RAM for applying data bits as a second part of respective addresses of the remaining RAM;

an adder coupled to a second predetermined number of data bus lines of the high-speed RAM; and a comparator connected to the adder and a predetermined error tolerance indication and having an output for indicating correlation of the data signal.

2. A high-speed correlator as claimed in claim 1 further comprising a plurality of latches connected to the data busses of the high-speed RAMs.

3. A high-speed correlator as claimed in claim 1 wherein the serial-to-parallel converter includes a shift-register.

4. A high-speed correlator as claimed in claim 3 wherein the serial-to-parallel converter includes a clock divider having a divided clock output.

5. A high-speed correlator or as claimed in claim 4 wherein the serial-to-parallel converter includes ECL-to-TTL (Emitter-Coupled Logic to Transistor-Transistor Logic) converters.

6. A high-speed correlator as claimed in claim 5 wherein the ECL-to-TTL converters include a data latch connected to the divided clock output.

7. A high-speed correlator as claimed in claim 5 wherein the ECL-to-TTL convertors include a ECL-to-TTL clock converter connected to the divided clock output.

8. A high-speed correlator as claimed in claim 1 wherein the plurality of latches comprises six parallel latches connected sequentially, a first latch connected to the serial-to-parallel converter each subsequent latch connected to the previous latch.

9. A high-speed correlator as claimed in claim 8 where the plurality of high-speed RAM comprises first, second, and third RAM and said one RAM is the second RAM.

10. A high-speed correlator as claimed in claim 9 wherein the address bus of the first RAM is connected to predetermined outputs of the first and second latch.

11. A high-speed correlator as claimed in claim 10 wherein the address bus of the second RAM is connected to predetermined outputs of the first, second, and third latches.

12. A high-speed correlator as claimed in claim 11 wherein the address bus of the third RAM is connected to predetermined outputs of the fourth, fifth and sixth latches.

* * * * *